United States Patent [19]
Derx et al.

[11] Patent Number: 4,771,731
[45] Date of Patent: Sep. 20, 1988

[54] LITTER BOX

[76] Inventors: Justus Derx, 31 Brando Cresent, Ottawa, Ontario, Canada, K1T 2C9; Michael Harrison, P.O. Box 4040 Station E, Ottawa, Ontario, Canada, K1S 6B1

[21] Appl. No.: 918,028

[22] Filed: Oct. 14, 1986

Related U.S. Application Data

[63] Continuation of Ser. No. 617,545, Jun. 5, 1984, abandoned.

[51] Int. Cl.⁴ .............................................. A01K 29/00
[52] U.S. Cl. ......................................................... 119/1
[58] Field of Search ............................................. 119/1

[56] References Cited

U.S. PATENT DOCUMENTS

| | | | |
|---|---|---|---|
| 2,971,493 | 2/1961 | Robb | 119/1 |
| 3,227,137 | 1/1966 | Goldman et al. | 119/1 |
| 3,332,397 | 7/1967 | Vander Wall | 119/1 |
| 3,771,493 | 11/1973 | Chandor | 119/1 |
| 3,990,396 | 11/1976 | Turk | 119/1 |
| 4,217,857 | 8/1980 | Geddie | 119/1 |
| 4,444,148 | 4/1984 | Lander | 119/1 |
| 4,487,163 | 12/1984 | Jobert et al. | 119/1 |
| 4,517,920 | 5/1985 | Yamamoto | 119/1 |

*Primary Examiner*—Robert P. Swiatek
*Attorney, Agent, or Firm*—Burns, Doane, Swecker & Mathis

[57] ABSTRACT

The application discloses a method, an apparatus and a system for the substantially odor-free collection and disposal of excreta from domestic animals, particularly cats. In a preferred system, a fluid impervious bag is arranged in a relatively deep tray as a liner, with the edge of the bag extending over the edge of the tray. An absorbent material including a deodorant and an odoriferous substance is placed in the bag. A second tray is nested onto the top of the bag and the lower tray. The second tray has a perforated base that serves to support a bed of commercial litter. The upper second tray engages the bag to hold it in place in the lower tray. The system thus assembled is substantially odor-free and has a very long service period. When the deodorant material is exhausted, the odoriferous substance gives off a detectable scent to advise that the litter should be changed. The bag serves for disposal of wastes and spent litter.

14 Claims, 1 Drawing Sheet

U.S. Patent
Sep. 20, 1988
4,771,731
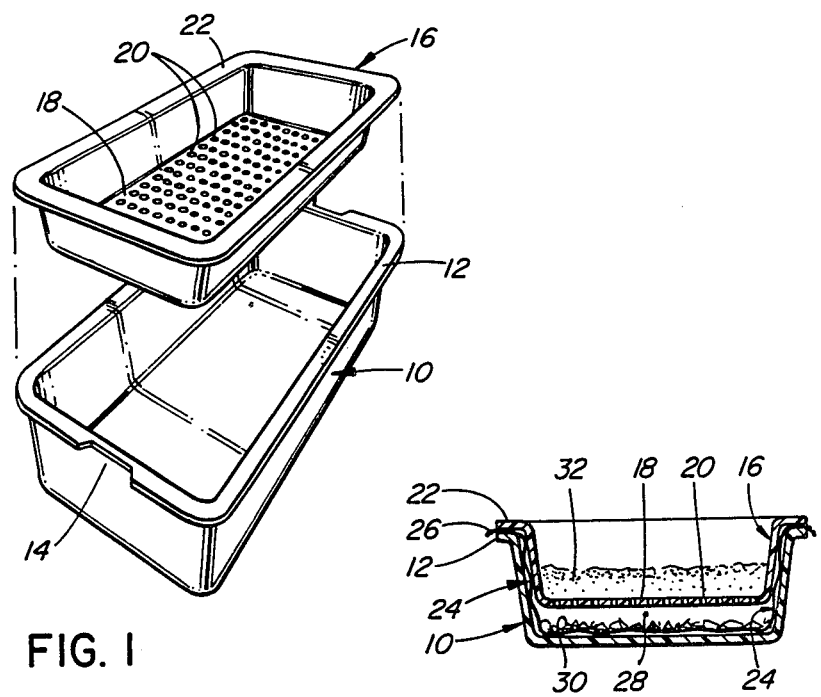
FIG. 1
FIG. 3
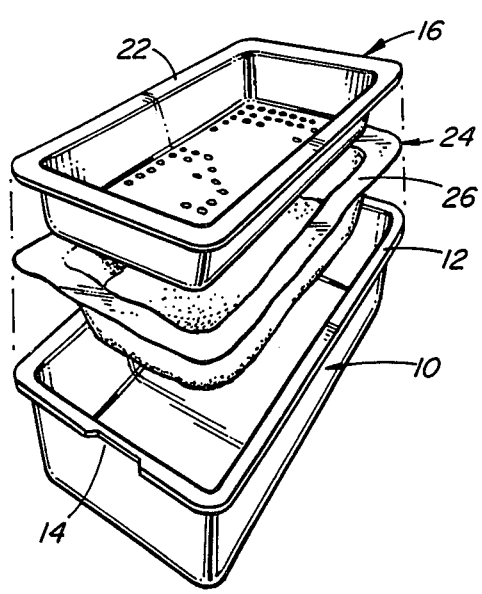
FIG. 2

LITTER BOX

This is a continuation of application Ser. No. 617,545 filed June 5, 1984, and now abandoned.

BACKGROUND OF THE INVENTION

1. Field of the Invention

The present invention relates to the collection and disposal of excreta from pet animals. It has particular application to the type of appliance known as a litter box, commonly provided for domestic cats.

2. Description of the Prior Art

There are certain disadvantages associated with the use of indoor litter boxes for domestic cats. The litter material used, commonly a commercially available litter material, is rapidly saturated with urine whereupon the litter box gives off a strong and most unpleasant odor. Disposal of the saturated litter is unpleasant and often awkward. While there have been several proposed solutions to these disadvantages, these generally involve the provision of complex, expensive and not entirely satisfactory litter box constructions.

It is the aim of the present invention to provide a novel method, apparatus and system for dealing with animal wastes that are simple, inexpensive and yet highly effective.

SUMMARY OF THE INVENTION

According to one aspect of the present invention there is provided a method of collecting and disposing of domestic pet wastes, comprising:

(a) arranging a fluid impervious disposable bag as a liner in a lower tray, with a peripheral section of the bag overlying a peripheral rim of the lower tray;

(b) locating a litter tray with a liquid pervious bottom in an upper portion of the bag and in engagement with the peripheral rim of the lower tray to hold the bag in place in the lower tray;

(c) providing a bed of litter in the litter tray;

(d) exposing the assembled trays, bag and litter for use by a domestic pet;

(e) dumping the bed of used litter from the litter tray into the bag; and (f) closing the bag and removing it from the lower tray for disposal.

According to another aspect of the present invention there is provided an apparatus for use in the collection and disposal of domestic pet wastes, comprising:

a lower tray adapted to receive a fluid impervious bag as a liner therein with a peripheral section of the bag overlying a peripheral rim of the lower tray; and a litter tray having a liquid pervious bottom and adapted to nest into the upper part of the lower tray so as to hold the bag in place in the lower tray.

According to a further aspect of the present invention there is provided a system for disposing of domestic animal wastes comprising:

a lower tray;

a fluid impervious bag disposed as a liner in the lower tray with a peripheral section of the bag overlying a peripheral rim of the lower tray;

a litter tray having a liquid pervious bottom, said litter tray nesting into the upper part of the lower tray with it's bottom spaced from the bottom of the lower tray to provide a chamber therebetween, the litter tray engaging the disposable bag to hold the bag in place in the lower tray; and a bed of litter in the litter tray.

The litter bed in the litter tray is used by an animal in the same way as the conventional bed of litter in a litter box. However, urine will pass through the pervious bottom of the litter tray and into the disposable bag lining the lower tray. This keeps the litter bed dry and provides a substantial increase in its service lift. To eliminate odor emission from the litter box, a deodorant material is added to the disposable bag. This deodorant material can be any material that suppresses the emanation of ammonia from urine. It may, for example, be charcoal or common baking soda.

The bag may, if desired, contain an absorbent material and possibly an odoriferous material giving off a scent, that, when detected, indicates that the deodorant in the bag is depleted. Suitable odoriferous materials are cedar chips and various perfumes.

The used litter is particularly simple to dispose of as it is dry and will pour readily from the litter tray into the open mouth of the disposal bag.

The nesting engagement of the litter tray in the lower tray provides a simple and convenient arrangement for retaining the disposable bag in place. It also enables the use of a relatively large bag, adequate to contain the bed of spent litter, while providing a relatively low profile for the litter box, a particularly desirable feature for young animals or those of small stature.

BRIEF DESCRIPTION OF THE DRAWING

Referring to the accompanying drawings, which illustrate an exemplary embodiment of the present invention:

FIG. 1 is a perspective, exploded view of an appartus for use in the collection of animal wastes;

FIG. 2 is a view like FIG. 1 including a disposable bag; and

FIG. 3 is a sectional elevation of the assembled collection and disposal system.

DESCRIPTION OF THE PREFERRED EMBODIMENT

Referring to the drawings, and particularly to FIG. 1, there is illustrated a lower tray 10 that is rectangular in outline shape and tapers downwardly in both length and width. A peripheral flange 12 projects outwardly from the upper peripheral rim of the tray 10. The flange includes two recessed areas 14 (one shown) on opposite sides for reasons that will be discussed in the following. The sides and base of the lower tray are imperforate.

FIG. 1 also illustrates a litter tray 16 that is of a rectangular shape similar to that of lower tray 10. The longitudinal and lateral dimensions of the litter tray 16 also taper from top and bottom. The base 18 of litter tray 16 is made liquid pervious by an array of small openings 20. At its upper peripheral rim, the litter tray 16 has an outwardly projecting peripheral flange 22.

Referring to FIG. 2, there is illustrated, in addition to the lower tray 10 and litter tray 16, a flexible, impervious bag 24 made of a suitable plastic material. This bag is sized and configured to fit into the lower tray 10 as a liner, with a peripheral section 26 of the bag overlying the peripheral flange 12 of the lower tray 10.

As illustrated in FIG. 3, the litter tray 16 nests into the upper portions of the bag 24 and the lower tray 10 with the flanges 22 and 12 of the litter and lower trays engaging the peripheral section 26 of the bag 24 between them so as to hold the bag in place. Because the litter tray 16 nests only into the upper portion of the lower tray 10, a chamber 28 is formed between the liquid pervious base 18 of the litter tray and the base of the lower tray 10. This chamber is lined by the bag 24 and, in the assembly illustrated in FIG. 3 contains a layer of material 30 consisting of a mixture of commercial litter, a deodorant material and an odoriferous material. This material or one or more of its ingredients may, if desired, be omitted. A bed of conventional, commercially available litter 32 is supported on the base 18 of the litter tray 16.

When the system is assembled for use as illustrated in FIG. 3, it is used by an animal, such as a cat, in the same way as a conventional litter box for the purposes of urination and excretion. The urine, rather than accumulating in the bed of litter 32 drains through the openings 20 in the base 18 of the litter tray 16 for accumulation in the chamber 28. This keeps the bed of litter 32 and any faeces deposited in the litter dry. The urine accumulating in the chamber 28 is absorbed and deodorized by the material 30. Once the deodorant capacity of the material 30 has been exhausted, the scent of the odoriferous material will be detected, thus indicating that the litter box should be cleaned.

Cleaning the litter box is a simple procedure. The litter tray 16 is lifted out of the assembly of bag 24 and lower tray 10 by gripping its peripheral flange 22 at the recesses 14 in the peripheral flange 12 of lower tray 10. The dry litter and faeces in the litter tray 16 can then be dumped directly into the bag 24 leaving little or no residue in the litter tray. The top of the bag can then be gathered and closed, and the bag disposed of with the household garbage.

It will thus be observed that the present litter box, and the disclosure method and system for collecting and disposing of domestic pet wastes is simple, inexpensive, clean and convenient. The service life of a bed of litter is extended considerably.

We claim:

1. A method of collecting and disposing of pet wastes, comprising:
   (a) arranging a fluid impervious disposable bag as a liner in a lower tray, with a peripheral section of the bag overlying the upper peripheral rim of the lower tray;
   (b) locating a litter tray with a litter impervious, liquid pervious bottom in an upper portion of the bag and in engagement via the bag material with the peripheral rim of the lower tray to hold the bag in place in the lower tray and support the litter tray such that its pervious bottom is located well above the bottom of the lower tray so as to form a chamber beneath said pervious bottom, said lower tray and litter tray nesting together such that said chamber is open to the atmosphere only through the liquid pervious, litter impervious bottom of the litter tray;
   (c) providing a bed of litter in the litter tray;
   (d) exposing the assembled trays, bag and litter for use by a domestic pet;
   (e) dumping the bed of used litter from the litter tray into the bag; and
   (f) closing the bag and removing it from the lower tray for disposal.

2. A method according to claim 1 including placing an absorbent material in the disposable bag beneath and spaced from said litter impervious, liquid pervious bottom.

3. A method according to claim 1 including placing a deodorant material in the disposable bag beneath and spaced from said litter impervious, liquid pervious bottom.

4. A method according to claim 1 including placing a deodorant material and an odoriferous material in the disposable bag beneath and spaced from said litter impervious, liquid pervious bottom.

5. A system for disposing of domestic animal wastes comprising:
   a lower tray;
   a fluid impervious bag disposed as a liner in the lower tray with a peripheral section of the bag overlying a peripheral rim of the lower tray;
   a litter tray having a litter impervious, liquid pervious bottom, said litter tray nesting into the upper part of the lower tray with its bottom space above the bottom of the lower tray to provide a chamber therebetween, the litter tray engaging the disposable bag to hold the bag in place in the lower tray, said lower tray and litter tray nesting together such that said chamber is open to the atmosphere only through the liquid pervious, litter impervious bottom of the litter tray and such that a domestic animal using said system is unable to contact the portion of the bag that is below the litter tray; and
   a bed of litter in the litter tray.

6. A system according to claim 5 including an absorbent material in the bag, below the litter impervious, liquid pervious bottom of the litter tray.

7. A system according to claim 5 including a deodorant material in the disposable bag below the litter impervious, liquid pervious bottom of the litter tray.

8. A system according to claim 5 including a deodorant material and an odoriferous material in the disposable bag beneath the litter impervious, liquid pervious bottom of the litter tray.

9. An apparatus for use in the collection and disposal of domestic pet waste, comprising:
   a lower tray receiving a fluid impervious bag as a liner therein with a peripheral section of the bag overlying an outwardly projecting flange at the upper peripheral rim of the lower tray, said lower tray having upwardly divergent walls;
   a litter tray having a liquid pervious, litter impervious bottom, upwardly divergent walls, and an outwardly projecting flange at the upper peripheral rim of the litter tray, said litter tray being configured to nest into the upper part of the lower tray with its outwardly projecting flange overlying the outwardly projecting flange of the lower tray such that the flanges engage and hold the peripheral section of the bag lining said lower tray, and support said litter tray in a nested position in said lower tray, said litter tray projecting into said lower tray so that the pervious bottom of said litter tray lies clear of the bottom of said lower tray and a bag liner therein so as to form a chamber therebetween to facilitate drying of a bed of litter in the litter tray and avoid contact of such litter with any moist material present in said chamber, said lower tray and litter tray nesting together such that said chamber is open to the atmosphere only through the liquid pervious, litter impervious bottom of the litter tray.

10. An apparatus as claimed in claim 9 wherein substantially all of said litter tray except its flange nests inside said lower tray such that the nested assembly has a relatively low profile of a height defined essentially by the height of said lower tray plus the thickness of the flange of the litter tray and the interposed peripheral section of a bag lining the lower tray.

11. An apparatus as claimed in claim 9 wherein the flange of the lower tray is inwardly recessed at at least two oppositely disposed sections so as to permit gripping of the overlying sections of the litter tray to facilitate lifting the litter tray from its nesting arrangement.

12. An apparatus as claimed in claim 9 including an absorbent material disposed in said air chamber beneath and spaced from said litter impervious, liquid pervious bottom.

13. An apparatus as claimed in claim 9 including a deodorant material in said air chamber beneath and spaced from said litter impervious, liquid pervious bottom.

14. An apparatus as claimed in claim 9 including a deodorant material and an odoriferous material in said air chamber beneath and spaced from said litter impervious, liquid pervious bottom.

* * * * *